United States Patent
Rhyu et al.

(10) Patent No.: US 9,208,707 B2
(45) Date of Patent: Dec. 8, 2015

(54) DISPLAY WINDOW MEMBER FOR PORTABLE TERMINAL AND METHOD FOR FABRICATING THE SAME

(75) Inventors: Ho-Suk Rhyu, Gyeonggi-do (KR); Jae-Chul Jin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 642 days.

(21) Appl. No.: 13/546,459

(22) Filed: Jul. 11, 2012

(65) Prior Publication Data

US 2013/0029084 A1    Jan. 31, 2013

(30) Foreign Application Priority Data

Jul. 29, 2011 (KR) .................. 10-2011-0075556

(51) Int. Cl.
  *G02F 1/1333* (2006.01)
  *G09F 23/00* (2006.01)
  *B29C 43/02* (2006.01)

(52) U.S. Cl.
  CPC .............. *G09F 23/00* (2013.01); *B29C 43/021* (2013.01); *G02F 2001/133331* (2013.01); *Y10T 428/24612* (2015.01); *Y10T 428/24777* (2015.01); *Y10T 428/24926* (2015.01); *Y10T 428/24983* (2015.01)

(58) Field of Classification Search
  CPC .......................................... G02F 2001/133331
  USPC ......................................................... 428/177
  See application file for complete search history.

(56) References Cited

U.S. PATENT DOCUMENTS

| | | | |
|---|---|---|---|
| 5,581,416 A | 12/1996 | Asai | |
| 8,243,424 B1* | 8/2012 | Babu et al. | 361/679.01 |
| 8,692,787 B2* | 4/2014 | Imazeki | 345/173 |
| 2009/0017263 A1* | 1/2009 | Yeates | 428/167 |
| 2012/0111491 A1* | 5/2012 | Huang et al. | 156/247 |

FOREIGN PATENT DOCUMENTS

JP      1995-248459 A     9/1995

* cited by examiner

*Primary Examiner* — Wen-Ying P Chen
(74) *Attorney, Agent, or Firm* — Cha & Reiter, LLC

(57) ABSTRACT

A method for fabricating a display window member for a portable terminal includes: fabricating a surface sheet to be attached to a surface of the window member; introducing the surface sheet into a mold; and molding the body of the window member by pouring poly synthetic resin into the mold, and at the same time, attaching the surface sheet to the outer surface of the body. Since the window member fabrication method employs a dual injection molding using polymer synthetic resin, the fabrication method can easily reduce the weight of the window member compared to the conventional fabrication method using a glass material only and can reinforce the surface hardness of the window member while easily fabricating the window member.

18 Claims, 2 Drawing Sheets

DISPLAY WINDOW MEMBER FOR PORTABLE TERMINAL AND METHOD FOR FABRICATING THE SAME

CLAIM OF PRIORITY

This application claims the priority under 35 U.S.C. §119(a) of an application entitled "Display Window Member For Portable Terminal And Method For Fabricating The Same" filed in the Korean Intellectual Property Office on Jul. 29, 2011 and assigned Serial No. 10-2011-0075556, the contents of which are hereby incorporated by reference.

BACKGROUND OF THE INVENTION

1. Field of the Invention

The present invention relates to an appliance having a display device, and more particularly to a display window member for a portable terminal, and a method for fabricating the same.

2. Description of the Related Art

In general, a portable terminal, such as a mobile communication terminal or a portable multimedia device, includes a display device, and a transparent window member is mounted on the display device so as to protect the display device.

An input device, such as a keypad or a track pad is provided to a conventional display device for inputting information. However, as various functions, such as Internet access, multimedia reproduction or the like, are performed in a single communication terminal, a display device for such a portable terminal is implemented with a touch screen function. The touch screen is large enough manipulating Internet access or a multimedia function, thus the functions of input and output devices through the display device with a touch screen function is more preferred.

As a touch screen operated over an extended time, the screen may be deteriorated due to damage, such as scratches on the surface of the window member. As a result, various efforts have been made to prevent a display device, especially a window member of a display device provided with a touch screen function, from being damaged.

A window member has been typically fabricated using an acryl sheet, injection molding using acryl, a polymer synthetic resin film, or the like. Using such polymer synthetic resins is poor in terms of surface quality or clarity and endurance for a display device with a touch function. In order to reinforce the endurance, in other words in order to reinforce the surface hardness of such a window member fabricated from a polymer synthetic resin material, coating may be applied on the display. However, such coating makes it difficult to secure evenness for the surface of the window member. If a window member with an uneven surface is applied to a display device, the window member will distort the screen of the display device.

Alternatively, a window member is fabricated using a tempered glass so as to prevent the surface of the window member from being damaged. Although such a tempered glass is superior in terms of surface quality, transmissivity and clarity, it has disadvantages in that its fabrication cost is high since repeated processing steps are required until it is completed as a window member with a desired specification and quality, and its yield is low since a defect may occur due to chips produced during the manufacturing process.

Moreover, when it is intended to implement a curved surface on a window member, it is more difficult to secure the required surface quality for a window member formed from a synthetic resin material, especially when the window member is fabricated from a tempered glass. Further, the manufacturing cost is further increased since the processing is more complicated.

Furthermore, a window member formed from a glass material has a disadvantage in that the possibility of being cracked or fractured is high when it is exposed to external impact or the like.

Accordingly, there is a need for an improved window member for a display device that addresses the above mentioned problems.

SUMMARY OF THE INVENTION

An aspect of the present invention is to provide a method for fabricating a window member for a display device of a portable terminal, by which a curved window member is fabricated with a good surface quality while having sufficient hardness.

Another aspect of the present invention provides a method for fabricating a window member which makes it easy to reduce the weight of the window member.

Also, another aspect of the present invention provides a method for fabricating a curved window member which can simplify the manufacturing process of the window member to reduce the manufacturing costs while allowing the window member to have sufficient hardness and good surface quality.

Moreover, another aspect of the present invention provides a window member having a surface formed from a glass material, in which the window member is adapted to minimize the exposure of the glass material to an external environment to reduce the exposure of the glass material to external impact or the like.

In accordance with an aspect of the present invention, there is provided a method for fabricating a display window member for a portable terminal, including: fabricating a surface sheet to be attached to a surface of the window member (hereinafter, the step will be referred to as a "sheet fabrication step"); introducing the surface sheet into a mold (hereinafter, the step will be referred to as a "sheet introducing step"); and molding the body of the window member by pouring poly synthetic resin into the mold, and at the same time, attaching the surface sheet to the outer surface of the body (hereinafter, the step will be referred to as a "molding step").

In accordance with another aspect of the present invention, there is provided a window member for a portable terminal, including: a body formed from a polymer synthetic resin material; and a surface sheet attached to a surface of the body through dual injection molding, wherein the surface sheet is fabricated from one selected from a glass material and a high-hardness sheet.

In accordance with the inventive method for fabricating a display window member for a portable terminal as described above, it is possible to reinforce the hardness of a surface of a body of a window member by applying a glass material or high-hardness film to the surface of the body of the window member, although the body of the window member is fabricated from a polymer synthetic resin material. As a result, if a window member for a touch screen is fabricated in accordance with the inventive fabrication method, it is possible to contribute to the improvement of the screen quality of the display device since the endurance of the window member can be reinforced.

In addition, since the inventive fabrication method can process the window member more easily as compared to the conventional fabrication method using a glass material only, the manufacturing costs can be reduced, and the weight of the window member can be easily reduced. Moreover, since the inventive fabrication method fabricates the window member using injection molding while reinforcing the surface hardness thereof, it is possible to form a surface of the window member as a curved surface, which can contribute to the diversification of the design of portable terminals or the like. Also, although the window member is formed from two different materials, the adhering force between the two materials can be reinforced and foreign matters can be prevented from being interposed between the materials since the inventive fabrication method fabricates the window member through dual injection molding. Furthermore, if a flange or a protection area is formed on the body of the window member in the process of injection molding, it is possible to prevent the cracking or deformation of the surface sheet, even if the surface sheet is formed from a glass material.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
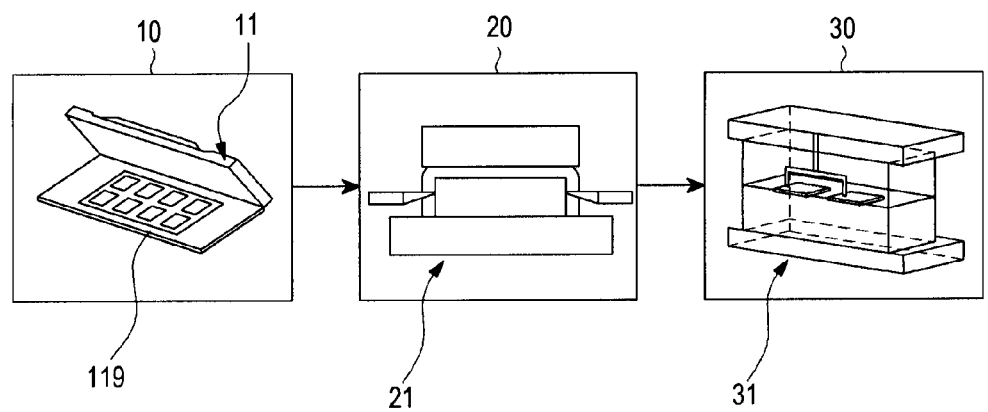
FIG. 1 is a view for describing a method of fabricating a display window member for a portable terminal in accordance with an embodiment of the present invention.

FIG. 1 is a flowchart showing a method of fabricating a window member 101 (see FIG. 3) for a portable window in accordance with an embodiment of the present invention.

Figure 3:
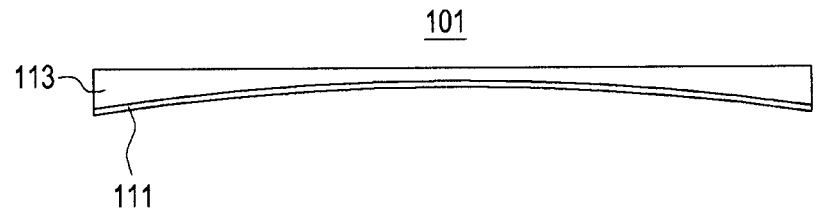
FIG. 3 is a side view showing a window member fabricated in accordance with the fabrication method shown in FIG. 1.

Referring to FIGS. 1 and 3, the window member fabricating method in accordance with an embodiment of the present invention briefly includes: fabricating a surface sheet 111 (see FIG. 3) to be positioned on a surface of the window member 101 (hereinafter, the step will be referred to as a "sheet fabrication step"); introducing the surface sheet 111 into a mold 31 (hereinafter, the step will be referred to as a "sheet introducing step"); and molding the body 113 (see FIG. 3) of the window member 101 using the mold 31, and at the same time, attaching the surface sheet 111 to the outer surface of the body 113 (30) (hereinafter, the step will be referred to as a "molding step").

The sheet fabricating step is a step for fabricating the surface sheet 111 to be positioned on the surface of the window member 101, in which the surface sheet 111 is formed from a glass material or a high-hardness film. As shown in FIG. 1, the sheet fabrication step may be divided into a printing step (10) and a processing step (20). The printing step 10 is a step for printing a design of the surface sheet to be fabricated on a raw glass plate or sheet material 119 using a printing tool 11. Note that the printed design corresponds to the basic shape of the window member to be fabricated. In addition, an edge area of the window member 101 may be printed with a bezel, an emblem representing a manufacturer of the window member, or an emblem representing a telecommunication company that provides a mobile communication service through a terminal provided with the inventive window member 101.

If a bezel or a manufacturer's emblem is printed on the surface sheet 111, various structures may be formed on the body 113 of the window member 101. A conventional window member is fabricated by processing a tempered window or through injection molding, thus a bezel, a manufacturer's emblem or the like is printed on the inner surface of the fabricated window member, or attached to the inner surface in the form of a film. Therefore, it is impossible to form a separate structure on the inner surface of the conventional window member, and the window member is attached to a housing of a portable terminal or the like using a double-sided adhesive tape, adhesive, or the like. Since the inventive window member fabrication method attaches a surface sheet to the outer surface of a window member and a bezel, a manufacturer's emblem or the like can be printed on the surface sheet, therefore it is possible to form various structures on the inner surface of the body. That is, even if the window member is light-transmissive, the structures formed on the inner surface of the body can be concealed with the printed bezel or the like. Therefore, the window member can be assembled to a product, such as a portable terminal, without using an adhesive material, such as a double-sided adhesive tape.

The processing step 20 is a step for cutting and processing the raw glass plate or sheet material in accordance with the printed design from the printing step 10. Here, a design-printed raw glass plate or sheet material 119 is cut and processed using a processing tool 21 to complete a surface sheet.

In fabricating the surface sheet 111 through the above-mentioned process, the thickness of the surface sheet 111 is preferably not less than 0.1 mm but not more 0.2 mm, and preferably has a hardness of not less than 10H with reference to pencil hardness.

Thereafter, the sheet introducing involves introducing the surface sheet 111 completed through the printing and processing steps 10 and 20 into the mold 31. That is, the window member 101 is fabricated through injection molding, wherein the window member 101 is molded through dual injection molding in which the surface sheet 111 is placed in the mold 31 in advance before the polymer synthetic resin is poured into the mold 31.

Figures 2A, 2B:
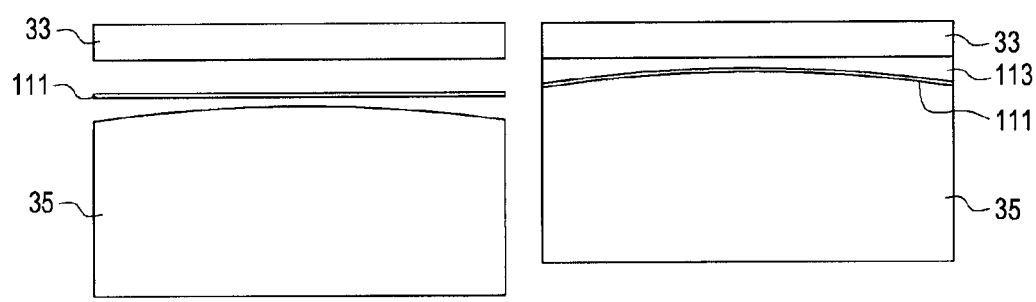
FIGS. 2A and 2B is a view for describing a mold for performing a molding step in the window member fabricating method shown in FIG. 1 respectively.

As shown in FIGS. 2A and 2B, the mold 31 consists of an upper mold part 33 and a lower mold part 35, wherein one of the upper and lower mold parts 33 and 35 may have a curved molding surface. If one of the upper and lower mold parts 33 and 35 has a curved molding surface, one side of the molded window member 101 will be curved. Here, if the surface to be provided with the surface sheet 111, i.e. the outer surface of the window member 101 is curved as shown in FIG. 3, it can contribute to the diversification of the design of portable terminals as a bezel, a manufacturer's emblem or the like can be printed on the outer surface sheet.

In a state in which the surface sheet 111 is placed in the mold, the upper and lower mold parts 33 and 35 are engaged with each other, and the polymer synthetic resin is poured into and then cured in the mold, thereby completing the window member 101. The surface sheet 111 is attached to the body 113 of the window member 101 while the polymer synthetic resin poured into the mold 31 is being cured. That is, the surface sheet 111 is attached to the body 113 in the process of molding the body 113, thereby completing the window member 101. Although the surface sheet 111 completed through the printing and processing steps 10 and 20 is substantially flat, it can be deformed into a curved shape by heat and pressure during the process of molding the body 113 in the mold 10.

The body 113 may be formed from polymer synthetic resin, more particularly from acryl resin, polymethylmethacrylate (PMMA) resin, or polycarbonate (PC) resin. The acryl resin, polymethylmethacrylate (PMMA) resin, and polycarbonate (PC) resin are preferred for a window member provided on a display device since transparency can be secured after they are cured.

When molding the body 113, it is possible to form a flange for assembling the window member to the housing of a terminal, or to form a protection area for protecting the surface sheet.

Figure 4:
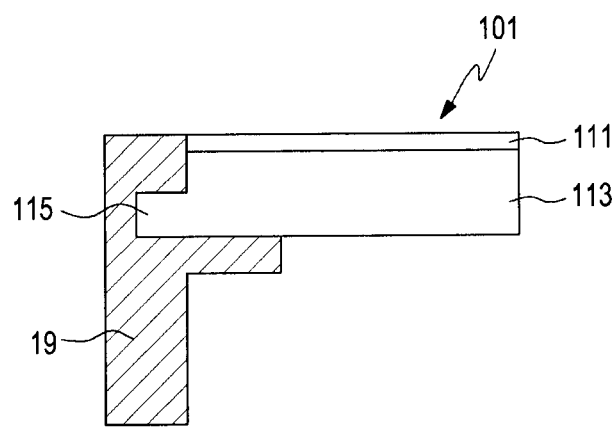
FIG. 4 is a view showing an example of the window member of FIG. 3 assembled to a portable terminal.

Referring to FIG. 4, a part of the window member 101 is supported by a structure formed in the housing 19, and a flange 115 is engaged with a groove formed in the housing 19 to anchor the window member 101 to the housing 19. The flange 115 extends outward around the body 113, and has a width of not less than 0.3 mm but not more than 1 mm from the outer periphery of the body 113, i.e. from the edges of the surface sheet 111.

Since the window member 101 allows the edges of the surface sheet 111 to be surrounded by the housing 19, the surface sheet 111 can be protected. That is, the edges of the surface sheet 111 can be prevented from directly contacting or colliding with an external object by a part of the housing 19.

Figure 5:
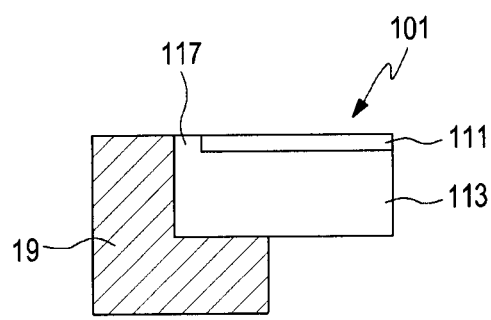
FIG. 5 is a view showing another example of the window member of FIG. 3 assembled to a portable terminal.

Referring to FIG. 5, in an alternate embodiment, a protection area 117 may be formed by making a part of the body 113 surround the edges of the surface sheet 111 when molding the window member 101. Preferably, the protection area 117 is formed in a width of not less than 0.2 mm but not more than 1 mm, and the surface sheet 111 will be protected by forming the protection area 117. Thus, the protection area 117 can prevent an external object from directly contacting or colliding with the edges of the surface sheet 111.

The flange or the protection area as described above may be entirely formed on the single body or may be selectively provided depending on the specification of a portable terminal

TABLE 1

| Material of window member | High-hardness film + acryl | Alkali-free glass + PC | Tempered glass |
|---|---|---|---|
| Processing method | Dual injection molding | Dual injection molding | Processing & polishing |
| Pencil hardness | Not less than 10 H | Not less than 10 H | Not less than 10 H |
| Specific gravity | 1.21 | 1.452 | 2.5 |
| Yield | 60 to 70% | 60 to 70% | 40 to 50% |
| Unit price | $4 | $4 | $6.4 |

Table 1 comparatively shows specific gravities, yields and manufacturing unit prices for window members fabricated through the above-mentioned fabrication method using a high-hardness film and acryl resin, window members fabricated through the above-mentioned fabrication method using a glass material known as alkali-free glass and PC, and conventional window members fabricated from a tempered glass.

From the comparison in Table 1, it can be seen that the window members fabricated through the inventive fabrication method are more economical and superior in terms of yield, and also can be fabricated to have a light weight using different materials, for example polymer synthetic resin as compared to the conventional window members fabricated from a tempered glass.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for fabricating a display window member for a portable terminal, comprising:
   fabricating a surface sheet to be attached to an outer surface of the window member;
   introducing the surface sheet into a mold;
   molding a body of the window member by pouring poly synthetic resin into the mold and attaching the surface sheet to an outer surface of the body;
   printing a design of the surface sheet to be fabricated on a raw sheet material; and
   processing the raw sheet material in accordance with the design printed on the raw sheet material.

2. The method as claimed in claim 1, wherein the design printed in fabricating of the surface sheet comprises a bezel or an emblem of a particular manufacturer.

3. The method as claimed in claim 1, wherein the printed design corresponds to a basic shape of the window member to be fabricated.

4. The method as claimed in claim 1, wherein the surface sheet is fabricated from one selected from a glass material and high-hardness film.

5. The method as claimed in claim 1, wherein the thickness of the surface sheet is not less than 0.1 mm but not more than 0.2 mm.

6. The method as claimed in claim 1, wherein in molding the body of the window member, the body is molded to have a flange extending beyond the edges of the surface sheet.

7. The method as claimed in claim 6, wherein the flange is formed around the body in a width of not less than 0.3 mm but not more than 1 mm from the edges of the surface sheet.

8. The method as claimed in claim 1, wherein in molding the body of the window member, the body is molded to have a protection area surrounding the edges of the surface sheet.

9. The method as claimed in claim 8, wherein the protection area is formed to surround the surface sheet in a width of not less than 0.2 mm but not more than 1 mm from the edges of the surface sheet.

10. The method as claimed in claim 1, wherein in molding the body of the window member, the outer surface of the window member is formed as a curved surface.

11. A window member for a portable terminal, comprising:
    a body formed from a polymer synthetic resin material;
    a surface sheet attached to a surface of the body through a molding process, wherein the surface sheet is fabricated from one selected from a glass material and a high-hardness sheet; and
    a flange extending outward around the body, wherein the flange is engaged with a groove formed in a housing of the terminal.

12. The window member as claimed in claim 11, wherein the flange is formed in a width of not less than 0.3 mm but not more than 1 mm from the outer periphery of the body.

13. The window member as claimed in claim 11, wherein the edges of the surface sheet is surrounded by the housing.

14. The window member as claimed in claim 11, further comprising a protection area provided at a part of the body, wherein the protection area is arranged to surround the edges of the surface sheet.

15. The window member as claimed in claim 14, wherein the protection area is formed in a width of not less than 0.2 mm but not more than 1 mm.

16. The window member as claimed in claim 11, wherein an edge area of the window member is printed with a bezel or an emblem representing a particular manufacturer.

17. The window member as claimed in claim 11, wherein the surface sheet attached to an outer surface of the window member is fabricated by;
    introducing the surface sheet into a mold; and
    molding a body of the window member by pouring poly synthetic resin into the mold and attaching the surface sheet to an outer surface of the body.

18. The window member as claimed in claim 17, wherein the surface sheet is fabricated by:
    printing a design of the surface sheet intended to be fabricated on a raw sheet material; and
    processing the raw sheet material in accordance with the design printed on the raw sheet material.

\* \* \* \* \*